United States Patent [19]

Rao

[11] Patent Number: 5,332,422
[45] Date of Patent: Jul. 26, 1994

[54] SOLID LUBRICANT AND HARDENABLE STEEL COATING SYSTEM

[75] Inventor: V. Durga N. Rao, Bloomfield Hills, Mich.

[73] Assignee: Ford Motor Company, Dearborn, Mich.

[21] Appl. No.: 88,014

[22] Filed: Jul. 6, 1993

[51] Int. Cl.$^5$ .............................. B22F 1/00
[52] U.S. Cl. ................................ 75/252; 75/253; 75/254
[58] Field of Search ..................... 75/252–255, 75/231

[56] References Cited

U.S. PATENT DOCUMENTS

| | | | |
|---|---|---|---|
| 1,654,509 | 12/1927 | Claus | 29/898.1 |
| 3,659,861 | 5/1972 | Rao et al. | 277/96 |
| 3,930,071 | 12/1975 | Rao et al. | 427/203 |
| 4,676,831 | 6/1987 | Engstrom | 75/252 |
| 4,872,432 | 10/1989 | Rao et al. | 123/193.4 |
| 5,080,056 | 1/1992 | Kramer et al. | 123/193.4 |
| 5,154,881 | 10/1992 | Rutz et al. | 75/231 |

Primary Examiner—George Wyzsomierski
Attorney, Agent, or Firm—Joseph W. Malleck; Roger L. May

[57] ABSTRACT

A plasma sprayable powder for coating surfaces such as cylinder bores of an internal combustion engine, comprising grain size agglomerates of (i) a plurality of solid lubricant particles selected from the group consisting of graphite, $MoS_2$, BN, $CaF_2$, and LiF; and (ii) fusable, ingredients adjacent the solid lubricant particles, the ingredients being air-hardenable upon friction-promoting-use, and the lubricants and fusable ingredients being agglomerated together by a low melting medium in the grains.

A solid lubricant coating system for use with a metal interface subject to high temperatures and wet lubrication, comprising agglomerates of particles of (i) solid lubricant particles selected from the group consisting of graphite, boron nitride, molybdenum disulfide, lithium fluoride, NaF, $WS_2$, and calcium fluoride; and (ii) steel particles fused together and bounding said solid lubricant particles at least at certain intersections, certain portions of said steel particles being air-hardened to a high hardness upon exposure of the coating to the interface at high temperatures.

9 Claims, 9 Drawing Sheets

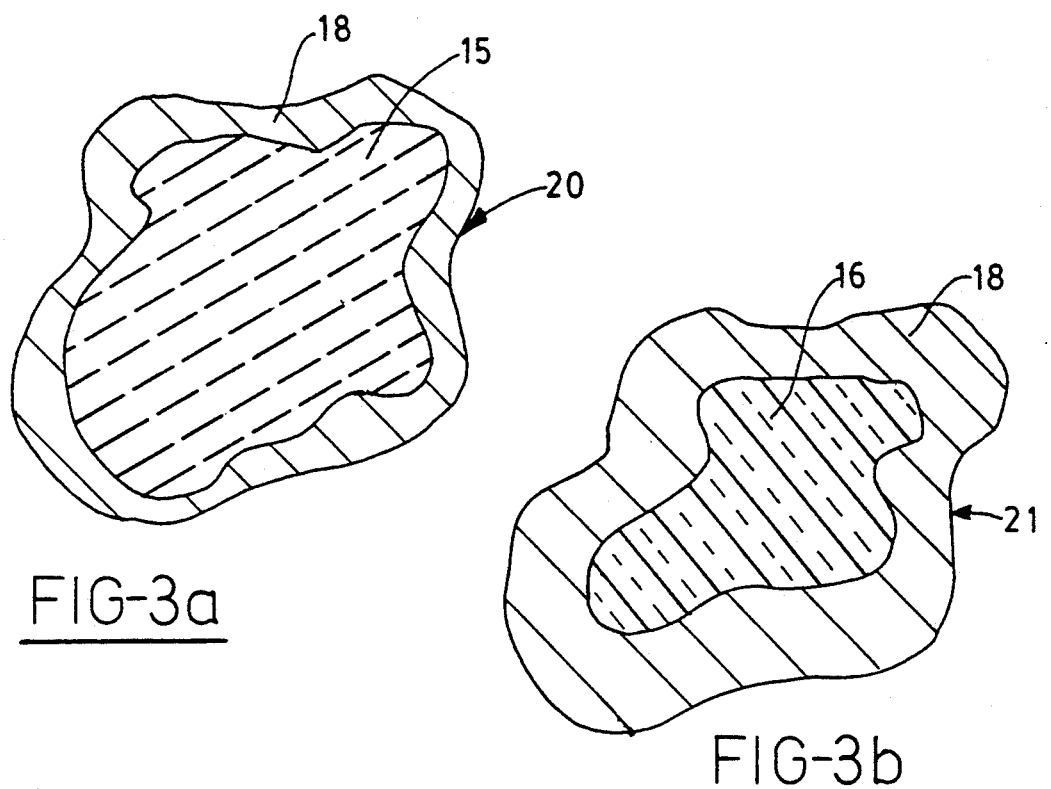
FIG-3a
FIG-3b
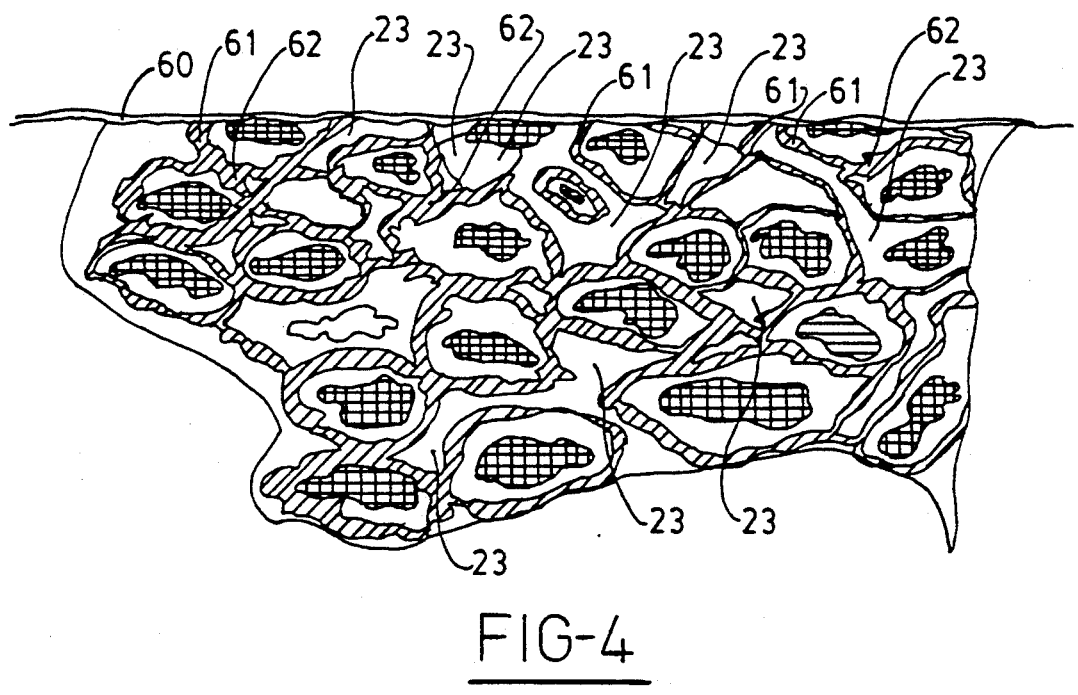
FIG-4

SOLID LUBRICANT AND HARDENABLE STEEL COATING SYSTEM

BACKGROUND OF THE INVENTION

1. Technical Field

This invention relates to the art of fluid lubricated metal wear interfaces or contacts, and more particularly to the use of anti-friction solid film lubricants for such interfaces modified to withstand high unit scraping or bearing loads at high temperatures while functioning with either full or partial wet lubrication.

2. Discussion of the Prior Art

The utility of certain solid film lubricants for bearings has been known for some time. U.S. Pat. No. 1,654,509 (1927) discloses use of powder graphite trapped or covered by a metal binder (i.e., iron, aluminum, bronze, tin, lead, babbitt, or copper) to form a thick coating; the metal is heated to at least a thermoplastic condition by melting or arc spraying to bury the graphite. The coating offers limited friction reducing characteristics. Unfortunately, (i) the graphite is not exposed except by significant wear of the metal, thus never realizing significantly lower friction; (ii) the metal is in a molten condition prior to trapping or burying the graphite, causing thermal effects and distortions; and (iii) oxides of the metal serve as the primary lubricant.

The prior art has also appreciated the advantage of thermally spraying (by oxy-fuel) aluminum bronze as a solid film lubricant onto cylinder bore surfaces of an engine as demonstrated in U.S. Pat. No. 5,080,056. The lubricating quality of such patented coating at high temperatures is not satisfactory because (i) it lacks compatibility with piston ring materials which usually comprise cast iron, molybdenum coated cast iron, or electroplated hard chromium; and (ii) thermal spraying of the material by oxy-fuel is not desirable because of very heat input necessitating elaborate tooling to dissipate rapidly such heat to avoid distortion of the cooled part.

The author of this invention has previously disclosed certain solid lubricants operable at high temperatures, but designed for either interfacing with ceramics, not metals, and generally at low load applications in the absence of any liquids, or with metals in an oilless environment. One solid film lubricant disclosed comprises graphite and boron nitride in a highly viscous thermoplastic polymer binder spread in a generous volume onto a seal support comprised of nickel and chromium alloy. The formulation was designed to provide a hard coating which softens at the surface under the load, while at or above the operating temperature and while functioning only under dry conditions. Thermoplastic polymer based formulations are unsatisfactory, unless substantially modified, in meeting the needs of a highly loaded engine component, such as a cylinder bore, because the interfacing surfaces are subject to wet lubrication, the unit loads are significantly higher (approaching 500 psi) and the surface temperatures are far higher, causing scraping. Another solid film lubricant disclosed was halide salts or $MoS_2$ (but not as a combination) in a nickel, copper, or cobalt binder; the coating, without modifications, would not be effective in providing a stable and durable anti-friction coating for the walls of an internal combustion cylinder bore, because the formulations were designed to operate under dry conditions and against ceramics (primarily lithiu;m aluminum silicate and magnesium aluminum silicate), and thus the right matrix was not used, nor was the right combination of solid film lubricants used. Particularly significant is the fact that formulations were designed to produce a ceramic compatible oxide (e.g., copper oxide or nickel oxide) through partial oxidation of the metal in the formulation. These systems were also designed to also permit as much as 300-500 microns of wear. Under the present invention, only 5-10 microns of wear is tolerated.

It is an object of this invention to provide a plasma sprayable powder for coating cylinder bores of an internal combustion engine, the powder having agglomerated grains of different solid lubricants, the agglomerates being surrounded by ingredients that are fusable and yet air-hardenable to promote islands of high hardness.

Another object of this invention is to provide a coating composition that economically reduces friction for high temperature applications, particularly along a cylinder bore wall at temperatures above 600° F. when oil lubrication fails or in the presence of oil flooding (while successfully resisting conventional or improved piston ring applied loads).

Another object is to provide a lower cost method of making coated cylinder walls by rapidly applying a coating by plasma spraying at reduced or selected areas of the bore wall while achieving excellent adherence and precise deposition, the method demanding less rough and finish machining of the final bore surface.

Still another object of this invention is to provide a coated aluminum alloy cylinder wall product for an engine that (i) assists in achieving reduced piston system friction and reduced piston blow-by, all resulting in an improved vehicle fuel economy of 2-4% for a gasoline powered vehicle; (ii) reduces hydrocarbon emissions; and (iii) reduce engine vibration by at least 20% at wide-open throttle conditions at moderate speeds (i.e., 1000-3000 rpm).

SUMMARY OF THE INVENTION

The invention, in a first aspect, is a thermally sprayable powder (particularly by plasma) for coating surfaces such as cylinder bores of an internal combustion engine. The powder comprises grain size agglomerates of (i) a plurality of solid lubricant particles selected from the group consisting of graphite, $MoS_2$, hexagonal BN, $CaF_2$, LiF, and eutectic mixtures of $LiF/CaF_2$ or $LiF/NaF_2$; and (ii) fusable ingredients adjacent the solid lubricant particles, the ingredients being air-hardenable upon friction-promoting-use, and the lubricants and fusable ingredients being agglomerated together by a low melting medium in the grains.

The invention, in a second aspect, comprises a solid lubricant coating system for use with a metal interface subject to high temperatures. The coating system comprises agglomerates of particles forming grains adhered to a metal substrate or interface, said particles being comprised of (i) solid lubricant particles selected from the group consisting of graphite, hexagonal boron nitride, molybdenum disulfide, lithium fluoride, calcium fluoride, and eutectic mixtures of $LiF/CaF_2$ or $LiF/NaF_2$; and (ii) steel particles fused together and bounding said solid lubricant particles at least at certain intersections, certain portions of said steel particles being air-hardened to a high hardness upon exposure of the coating to the interface at high temperatures. It is desirable that the steel particles be of a stainless steel character consisting preferably of 70% iron, 15-24% chromium, and about 8% nickel. The agglomerates preferably comprise by volume: 15-25% solid lubricant particles and 74-84% stainless steel particles. The air-hardened hardness of the steel is about Rc 60, and the coefficient of friction achieved by the coating system is about 0.14 dry and 0.06-0.08 under partially wet lubricated conditions.

Another aspect of this invention is a method of making anti-friction coated surfaces subject to sliding wear. The method comprises: (a) forming grains of agglomerated solid lubricant particles and air-hardenable, fusable ingredients such as steel particles, the particles being agglomerated by a low melting, easily combustible, ash-free binder or medium such as wax; (b) providing a light metal-based component surface; (c) thermally spraying such grains onto said surface in a thickness range of 100-250 microns to form a coating substantially devoid of the binder (the temperature of said thermal spraying eliminating the wax by ash-free combustion); (d) removing at least a portion of the fusable particles by honing to expose edges of such particles; and (e) subjecting the exposed particles to air hardening (i.e., by available interfacing friction resulting from the thermal spray deposition process).

Yet another aspect of this invention is an engine block with one or more anti-friction coated cylinder bores. The block comprises: (a) a cast aluminum based cylinder block having at least one cylinder bore wall; (b) an oil-attracting coating of grains fused to each other and to said bore wall, said grains comprising agglomerates of solid lubricant particles and hardened, fused particles, the solid lubricant particles being selected from the group consisting of graphite molybdenum disulfide, boron nitride, lithium fluoride, calcium fluoride, and eutectic mixtures of $LiF/CaF_2$ or $LiF/NaF_2$, the coating having been finish-honed to expose certain margins of the fused particles.

BRIEF DESCRIPTION OF THE DRAWINGS

FIG. 3a is a further enlarged view of one type of particle forming part of the grain of FIG. 3;

FIG. 3b is a further enlarged view of another type of particle forming part of the grain of FIG. 3;

FIG. 4 is a greatly enlarged schematic illustration of a microscopic section of a freshly deposited plasma sprayed coating;

DETAILED DESCRIPTION AND BEST MODE

To achieve a significant reduction in the coefficient of friction at high temperatures between normally oil-bathed metal contact surfaces, loaded to at least 10 psi, the coating system cannot rely on graphite or any one lubricant by itself, but rather upon a specific combination of solid lubricants entrained in an air-hardenable metallic framework that, when honed to a smooth interfacing surface, will function as wear-resistant, anti-friction bearing surfaces.

Figure 1:
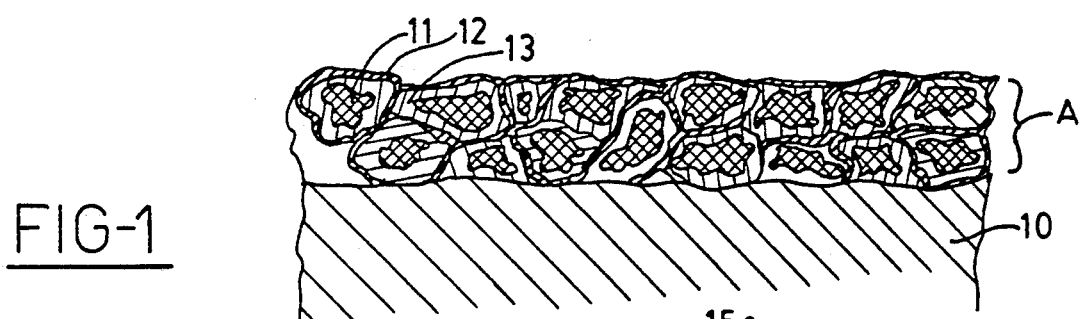
FIG. 1 is a schematic illustration of a microscopic section of a coating system embodying the principles of this invention.

As shown in FIG. 1, the inventive system comprises a layer A of powder grains adhered to a metal substrate or wall 10, each grain containing an agglomeration 11 of oil-attracting solid lubricant particles and air-hardenable, fusable ingredients surrounding each of the solid lubricant particles. The oil-attracting solid lubricant particles are selected from the group consisting of graphite, molybdenum disulfide, boron nitride, calcium difluoride, lithium fluoride, and eutectic mixtures of $LiF/CaF_2$ or $LiF/NaF_2$. The fusable air-hardenable ingredients are preferably a stainless steel consisting of about 4-24% chromium, 6-12% nickel when used, 4-6% manganese when used, 0-4% Al, and the remainder iron. The solid lubricants are stable at 600°-800° F. and give the coating high temperature stability for use in the cylinder bores of internal combustion engines. The grains adhere to the substrate as a result of fusion when the shells 12 of the fusable particles are softened as a result of thermal spraying. The unfused portion 13 of the air-hardenable particles provides an encapsulation in part for the solid lubricant-containing core.

Figure 2:
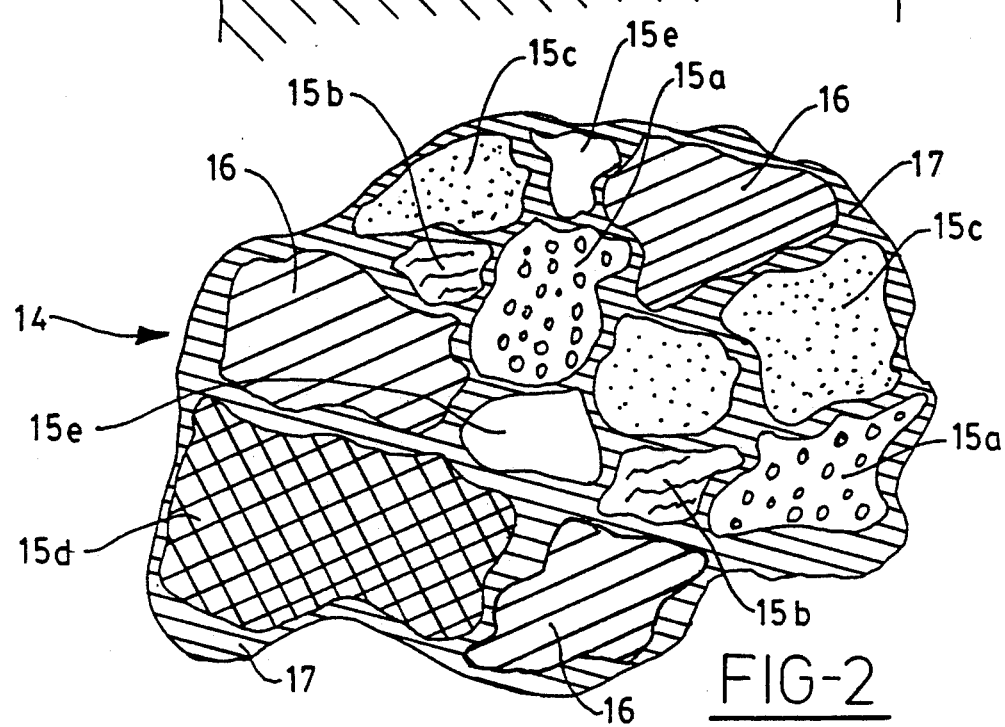
FIG. 2 is an enlarged sectional illustration of a grain of powder in accordance with this invention.

The powder, useful as a raw material in creating the coating system, is comprised of powder grains 14, such as shown in FIG. 2, which are agglomerates 11 of solid lubricant particles 15 here being boron nitride 15a, molybdenum disulfide 15b, graphite 15c, calcium difluoride 15d, and lithium fluoride 15e. Such solid lubricant particles are interspersed with air-hardenable steel particles 16 which are held together by a low melting medium or binder, such as wax, 17. The steel particles are selected from iron alloys containing (i) 8-20% chromium and 1-4% aluminum; (ii) 4-20% chromium, 4-6% Fin, and 6-12% Ni; and (iii) stainless steel having 15-24% Cr, and 8% nickel. The wax binder can be a wax having the following composition: 0.5-2.0% conventional carbowax, gum arabic, and poly vinyl alcohol. The solid lubricant particles preferably have a size in the range of 5-40 microns; the steel particles have a starting average particle size in the range of 20-50 microns. The agglomerated particles (in the wax binder) form grains having a size in the range of 40-55 microns. Such particle and grain size ranges are important because they make possible a flowable powder useful in the thermal spray deposition process. When the size is substantially below 40 microns, the powder will not flow freely; when significantly above 55 microns, stratification of the different particles will occur. The particles of solid lubricant desirably should be in a proportion of 15-25% of each grain with the steel particles being 74-84% by volume, the wax binder constituting less than 4% of the grains. However, the wax binder burns off during thermal spraying.

Alternatively, the metal encapsulation may be provided by hydrometallurgy whereby solid film lubricant particles are suspended in a solution of the easily decomposed salt of the metal at higher temperatures and pressure, the metal deposits on the surface of the particles.

Figure 3:
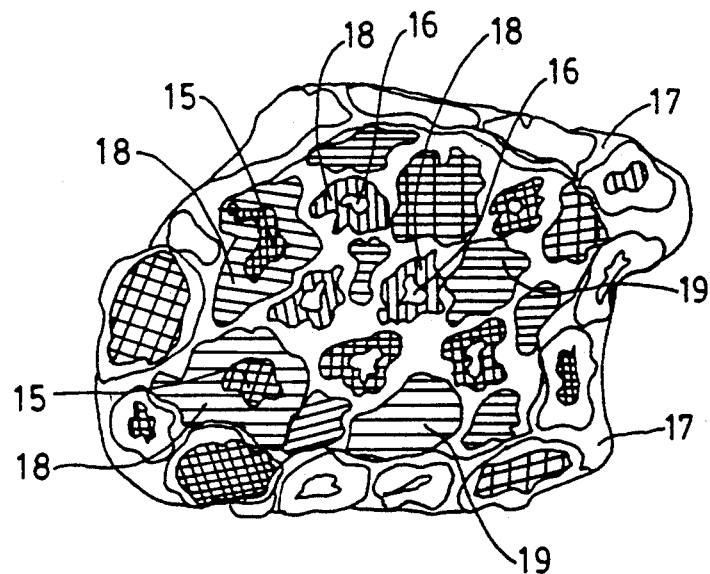
FIG. 3 is a view like FIG. 2, but illustrating an alternative powder grain composition.

As shown in FIG. 3, the solid lubricant particles 15 may be alternatively encapsulated within a metal shell 18 prior to agglomeration by wax; shell metal or metal alloy is selected from the group consisting of nickel, copper, iron, and cobalt. Such encapsulated particles are created by a prior treatment wherein solid lubricants are placed in a molten bath of the metal and stirred, and then the slurry is comminuted so as to form the encapsulated lubricant particles 20 (FIG. 3a). Similarly, the steel particles 16 may be encapsulated in the same type of shell 18 by a similar process to form a particle 21 (see FIG. 3b). The encapsulated particles then are bound together by the wax 17 to form the grains as previously discussed (see FIG. 3). Other hard particles 19 may be incorporated along with the encapsulated particles. The optional hard particles or encapsulated particles facilitate harder bearing surfaces or silts uniformly distributed throughout the coating. The powder may be made alternatively by spray drying; to this end, a water-based slurry of very fine particles is prepared (the particles are solid lubricants and soft metals (Ni, Co, etc.). The slurry is blended with 0.5-1.5% by weight water soluble organic binder such as gum arabic and/or polyvinyl alcohol or carbowax. The blended slurry is then atomized into a hot circulating air chamber at or about 300° F.

As shown in FIG. 4; the preferred coating, when operatively used, will have a glazed or polished outer surface 60 as a result of engine start-up use and will have edges 61 of the steel particle network 62 exposed as a result of honing to function much like needle bearings within the coating. The coating has a significantly useful porosity 23 which retains fluid oil for additional lubrication.

Figure 5:
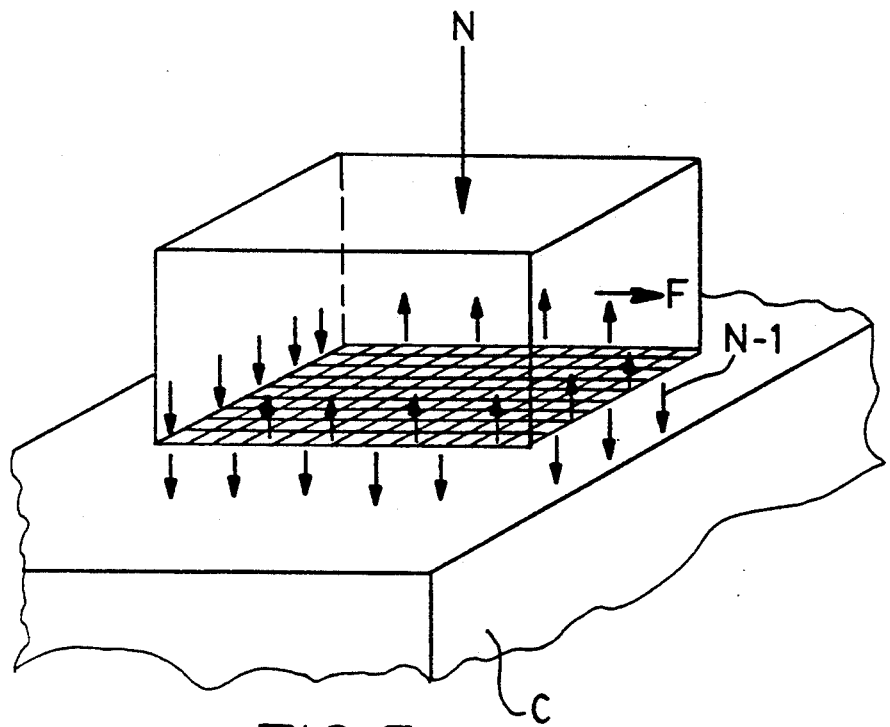
FIG. 5 is a schematic representation of the forces that influence coulomb friction.
Figure 6:
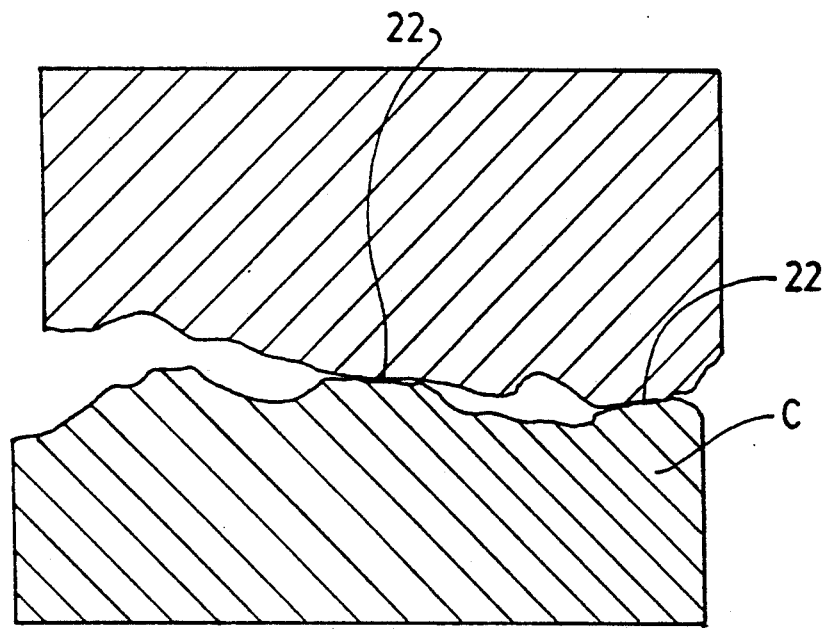
FIG. 6 is a highly enlarged microscopic view in cross-section of interfacing surfaces showing the irregularities of normal surfaces that affect coulomb friction.
Figure 7:
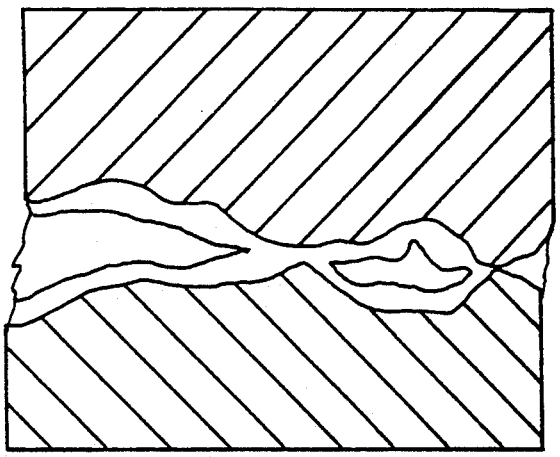
FIG. 7 is a view similar to FIG. 6 showing the incorporation of solid films on the interfacing surfaces that affect coulomb friction.

Friction in an oil-bathed environment will be dependent partly upon fluid friction and the oil film (layers in the fluid sheared at different velocities, commonly referred to as hydrodynamic friction), and, more importantly, dependent on dry or coulomb friction between contacting solid, rigid bodies (also referred to as boundary friction). Dry friction is tangential and opposed to the direction of sliding interengagement. As shown in FIG. 5, there is a visualization of the mechanical action of friction. The weight of a block (or applied load) imposes a normal force N on table C that is spread across several load forces N−1 at each interengaging hump 22 (see FIG. 6). The composite of all the tangential components of the small reaction forces F−1 at each of the interengaged humps 22 is the total friction force F. The humps are the inherent irregularities or asperities in any surface on a microscopic scale. When the interengaging surfaces are in relative motion, the contacts are more nearly along the tops of the humps and therefore the tangential reaction forces will be smaller. When the bodies are at rest, the coefficient of friction will be greater. Friction is influenced by the deformation and tearing of surface irregularities, hardness of the interengaged surfaces, and the presence of surface film such as oxides or oils. As a result, actual friction will be different from idealized perfect contact friction and will depend upon the ratio between shear and yield stresses of the interengaged surfaces. Thus, the presence of a film on each of the interengaging surfaces (see FIG. 7) will serve to change the coefficient of friction depending upon the shear and yield stress capacities of the films and their relative hardness.

Figure 8:
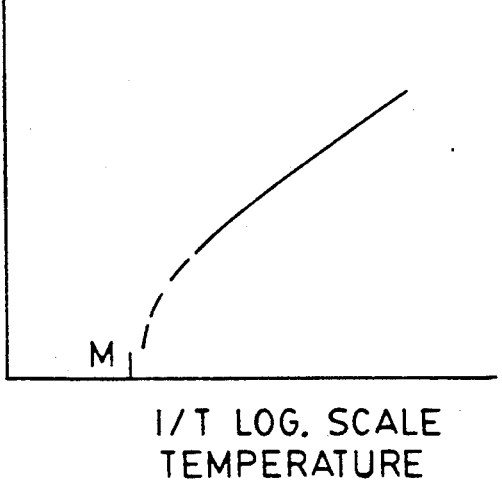
FIG. 8 is a graphical illustration of the onset of plastic flow of surface films as a function of stress and temperature.
Figure 9:
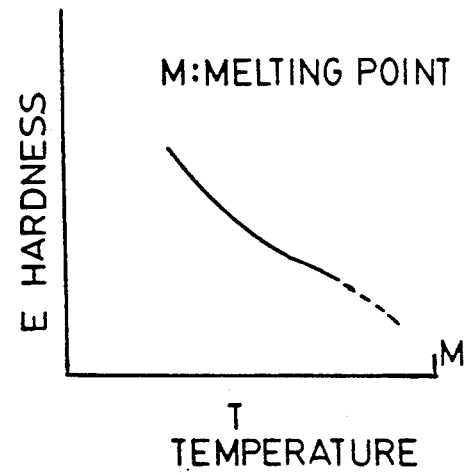
FIG. 9 is a graphical illustration of surface energy (hardness) as a function of temperature for surface films.
Figure 10:
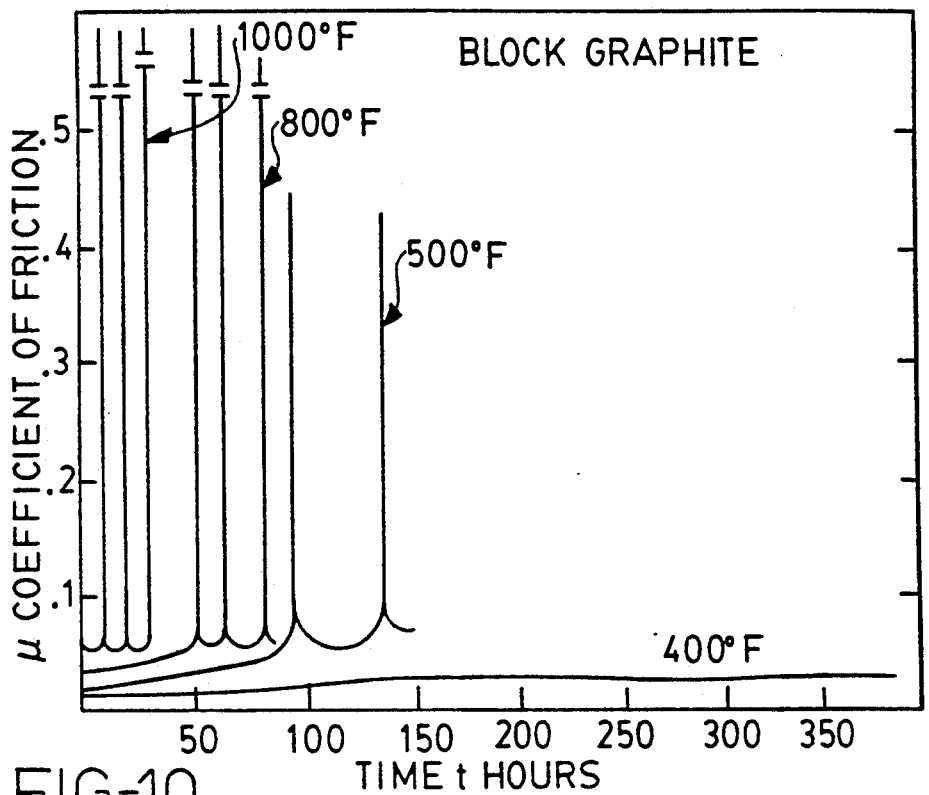
FIG. 10 is a graphical illustration of the coefficient of friction for block graphite as a function of time.
Figure 11:
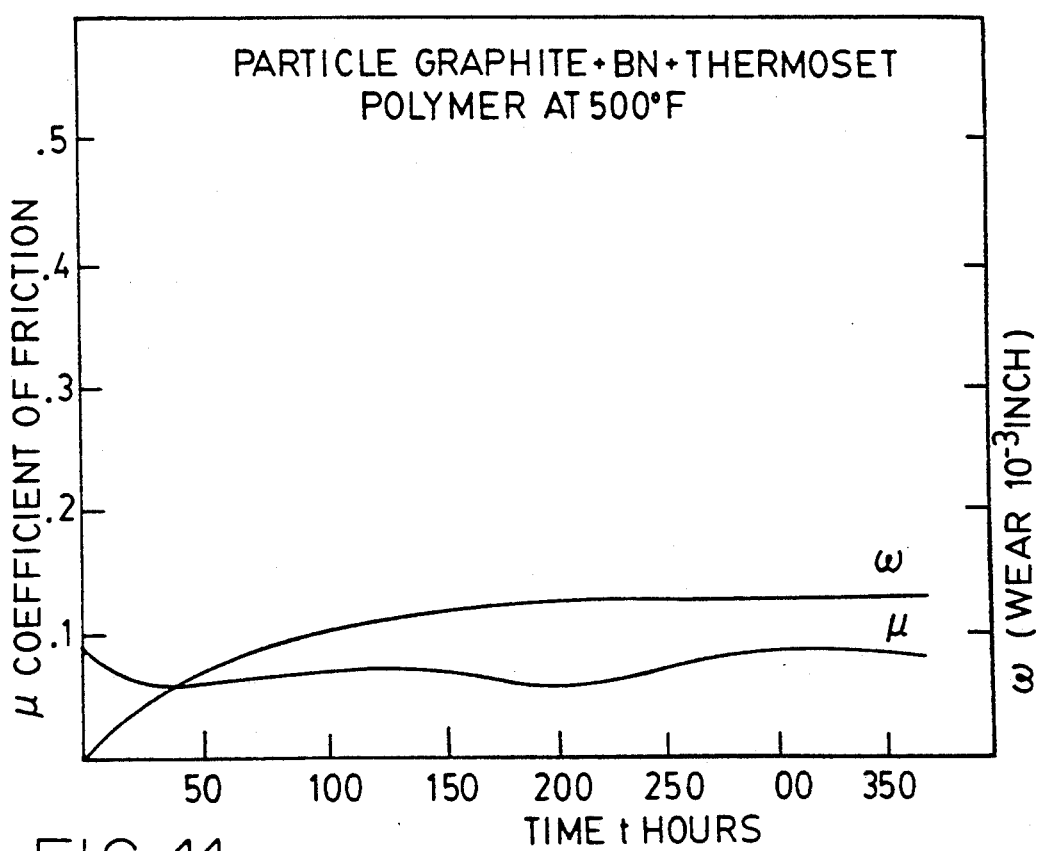
FIG. 11 is a graphical illustration of the coefficient of friction and also of wear as a function of time for the coating system of this invention tested at the temperature of 500° F.

Friction is also influenced significantly by temperature because high local temperatures can influence adhesion at the contact points. As shown in FIG. 8, as temperature goes up, the critical stress for slip goes down, exposing more surface to sliding and thereby increasing friction. As shown in FIG. 9, as the temperature approaches melting, the hardness (E) goes down, resulting in galling and scuffing. This is accounted for in the friction equation:

f is proportional to $1/(T_s-T)$, $T_s$ being the surface temperature and T being the bulk temperature of the sliding part The influence of temperature is particularly evident on graphite as shown in FIG. 10. The coefficient of friction for block graphite rapidly increases to above 0.4 at 500° F. and above 0.5 at 800° F., and even higher at 1000° F. The coefficient of friction for graphite at 400° F. or lower becomes generally uniform at below 0.05. Contrast this with the coefficient of friction performance and wear performance of the coating system of this invention represented in FIG. 11. You will note that the coefficient of friction generally uniformly stays below 0.1, and wear is generally uniform at about 0.001"/100 hours at 500° F. (see FIG. 11). The coating for FIG. 11 comprises only particles of graphite, boron nitride, and a thermoset polymer.

At least two different solid lubricant particles must be present in the powder grains. Graphite, when selected, should be present in an amount of 20-70% by weight of the solid lubricants. Graphite, as earlier indicated, is effective as a solid lubricant only up to temperatures around 400° F. and possesses very poor load bearing capability such as that experienced by a piston ring scraping against the graphite itself. Molybdenum disulfide, when selected, should be present in an amount of 20-70 % by weight of the solid lubricants, and, most importantly, is effective in increasing the load bearing capability as well as the temperature of low friction stability of the mixture up to a temperature of at least 580° F., but will break down into molybdenum and sulfur at temperatures in excess of 580° F. in air or non-reducing atmospheres. Molybdenum disulfide reduces friction in the absence of oil or in the presence of oil, and, most importantly, supports loads of at least 10 psi at such high temperatures. Molybdenum disulfide is also an oil attractor and is very useful in this invention.

Boron nitride, when selected, should be present in an amount of 5–40% by weight of the solid lubricants, and increases the stability of the mixture up to temperatures as high as 700° F. and concurrently stabilizes the low friction temperature limit for the ingredients of molybdenum disulfide and graphite. Boron nitride is also an effective oil attractor. Calcium difluoride and lithium fluoride are oil attractors and are stable up to temperatures of 1500° F. and 1200° F., respectively, and resist loads of at least 10 psi. The coating A must be porous, having a pore volume 23 of at least about 2–10%, as shown in FIG. 4. Porosity allows fluid oil to be retained in the pores of the coating as an impregnant during operation of the engine. Such temperature stability is important because typical engine cylinder bore wall will experience, at certain zones thereof and under certain engine operating conditions such as failure of coolant or oil pump), temperatures as high as 700° F. even though the hottest zone of the cylinder bore surface in the combustion chamber, during normal operation, is only about 540° F. The optimum mixture contains all of such solid lubricant ingredients, which will provide for a temperature stability up to temperatures as high as 800° F., load bearing capacities of at least 10 psi, and excellent oil attraction capability. The coefficient of friction for the grains in the deposited condition will be in the range of 0.07–0.08 at room temperature, and a coefficient of friction as low as 0.03 at 700° F.

Method of Making Coated Surfaces

Figure 12:
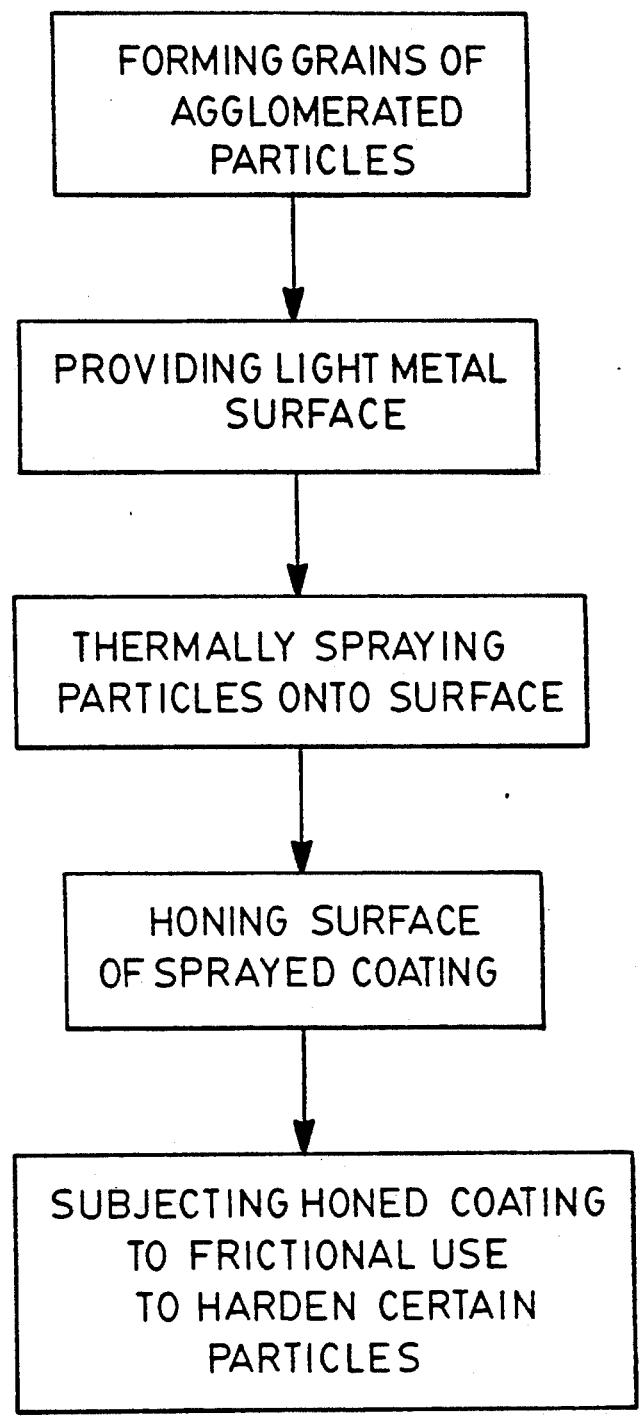
FIG. 12 is a block diagram showing schematically the steps involved in the method of making the coated components of this invention.

As shown in FIG. 12, the comprehensive method of making coated surfaces such as cylinder bore walls, according to this invention, comprises the series of steps: (a) forming grains of agglomerated particles, the particles including solid lubricants and air-hardenable metals; (b) providing a light metal or light metal alloy surface, the metal being selected from the group of aluminum, magnesium, silicon, and titanium; (c) thermally spraying the agglomerated particles onto the surface, the cylinder surface may be the parent bore surface of a cylinder block; (d) honing the sprayed coating on the surface to a predetermined thickness and smoothness to expose edges of the metallic fused network of the coating as well as smear the solid lubricants across the honed surface; and (e) subjecting the honed coating to frictional use to harden at least some portion of the metallic content of the grains of the coating.

Such method provides several new features that should be mentioned here. Plasma sprayed powder (i) will form a controlled porosity that allows for impregnation of wet oil; (ii) the encapsulated powder grains create asperities in the surface such that, when honed, the edges of the shell metal provide a smaller localized area of hard supporting asperities where boundary layer shear will take place in the smeared solid lubricant thereover to further reduce friction (similar to microgrooving); and (iii) the adherent metal network created as a result of melting only the outer skin of the soft metal shells during plasma spraying.

Figure 13:
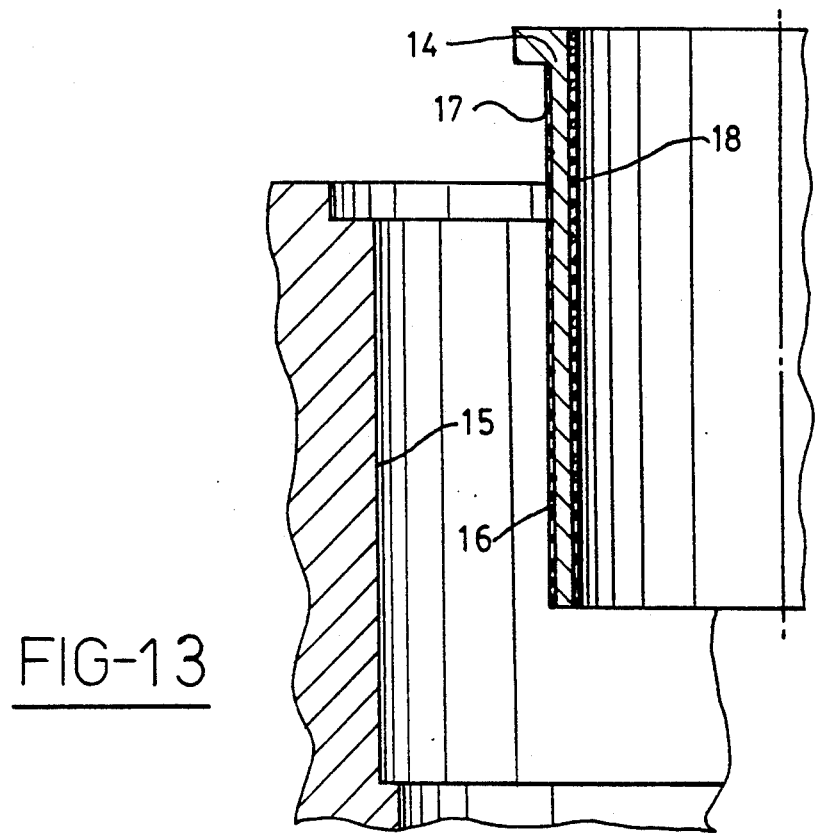
FIG. 13 is an enlarged sectional view of a portion of a liner in position for being installed in a cylinder block bore and carrying the coatings necessary to this invention.

As shown in FIG. 13, if a liner 14 is used as the surface to be coated, the liner 14 would preferably be constituted of the same material as that of the parent bore surface 15. However, the liner can be any metal that has a higher strength as the metal of the parent bore wall; this is often achieved by making an alloy of the metal used for the parent bore wall. For example, C-355 or C-356 aluminum alloys for the liner are stronger than the 319 aluminum alloy commonly used for aluminum engine blocks. The liner must have, generally, thermal conductivity and thermal expansion characteristics essentially the same as the block. Preferably, only the liner is coated interiorly at 18, as will be described subsequently, and the liner then assembled to the parent bore by either being frozen to about a temperature of −40° F. while maintaining the parent bore at room temperature, or the parent bore may be heated to 270° F. while the liner is retained at room temperature. In either case, a shrink-fit is obtained by placing the liner in such differential temperature condition within the parent bore 15. Preferably, the liner is coated at 17 on its exterior surface 16 with a copper flake epoxy mixture (70–90% copper flake), the epoxy being of the type described for use in coating. The copper flake within such epoxy coating assures not only an extremely solid bond between the liner and the light metal parent bore, but also increases the thermal transfer therebetween on a microscopic scale. The liner may also be cast-in-place when the block or bore wall is being formed; such liner would then be treated as the parent bore surface. In such case, the liner can also be made from the solid film lubricants and air-hardenable metal powder composition and formed into a liner shape by conventional powder metal forming and sintering techniques.

Plasma spraying of a flowable powder is carried out to form an adherent porous layer of powder grains on the bore wall or surface, the powder consisting of particles of solid lubricant selected from the group of graphite, molybdenum disulfide, boron nitride, calcium difluoride, and lithium fluoride. The flowable powder can be and often is a composite of the solid film lubricant and the soft metal powder produced by spray drying in which a combustible, ash-free, organic binder (such as 1% carbowax) and/or 0.5% gum arabic are used to produce the slurry from which the spray-dried powder is produced. The coating is also subjected to high temperature frictional use to harden at least a portion of the metallic contents of the grains.

It is desirable to not only have powder grains of solid lubricant encased in a soft metal shell, such as nickel, but also powder grains of solid hard metal such as FeCrMn or FeNin. The outer shells of these two different grains will melt and alloy-fuse during plasma spraying to create an even harder alloyed metal network such as FeCrNiMn and FeNiMn.

Figure 14:
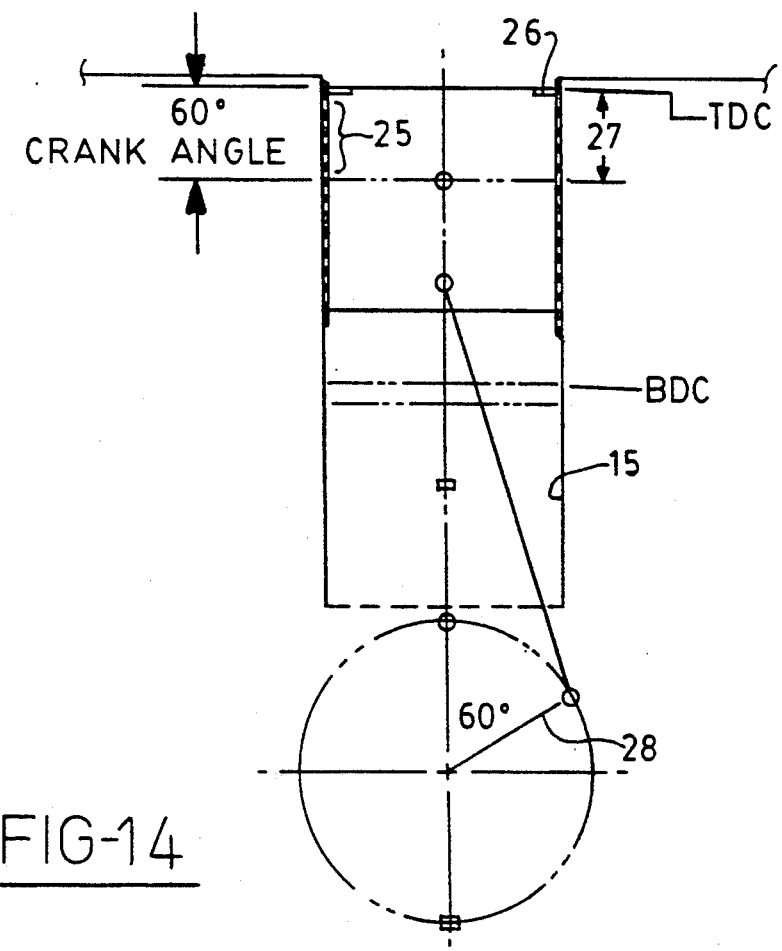
FIG. 14 is a schematic illustration of the mechanics involved in reciprocating a piston within a cylinder bore showing the travel of the piston rings which promote a loading on the cylinder bore coating system.

It may be possible, in some cases, to coat only a segment 25 of the entire cylinder bore surface 15. As shown in FIG. 14, the location of conventional sliding piston rings 26 moves linearly along the bore wall a distance 27. The locus of the piston ring contact with the coating is moved by the crank arm 28 during an angle representing about 60° of crank movement. This distance is about one-third of the full linear movement of the piston rings (between top dead center (TDC) and bottom dead center (BDC)). The distance represents the hot zone of the bore wall where lubrication can vary and the bore wall is most susceptible to drag and piston slap, which is the source of a significant portion of engine friction losses, and also the cause of scuffing of the bore wall in case of wet lubricant failure. The segment 25 would desirably be undercut to receive the thermally sprayed coating in a thickness that fills at least the undercut. Then, on honing simultaneously both the filled undercut and aligned bore wall, a smooth surface for the piston rings is created.

Figure 15:
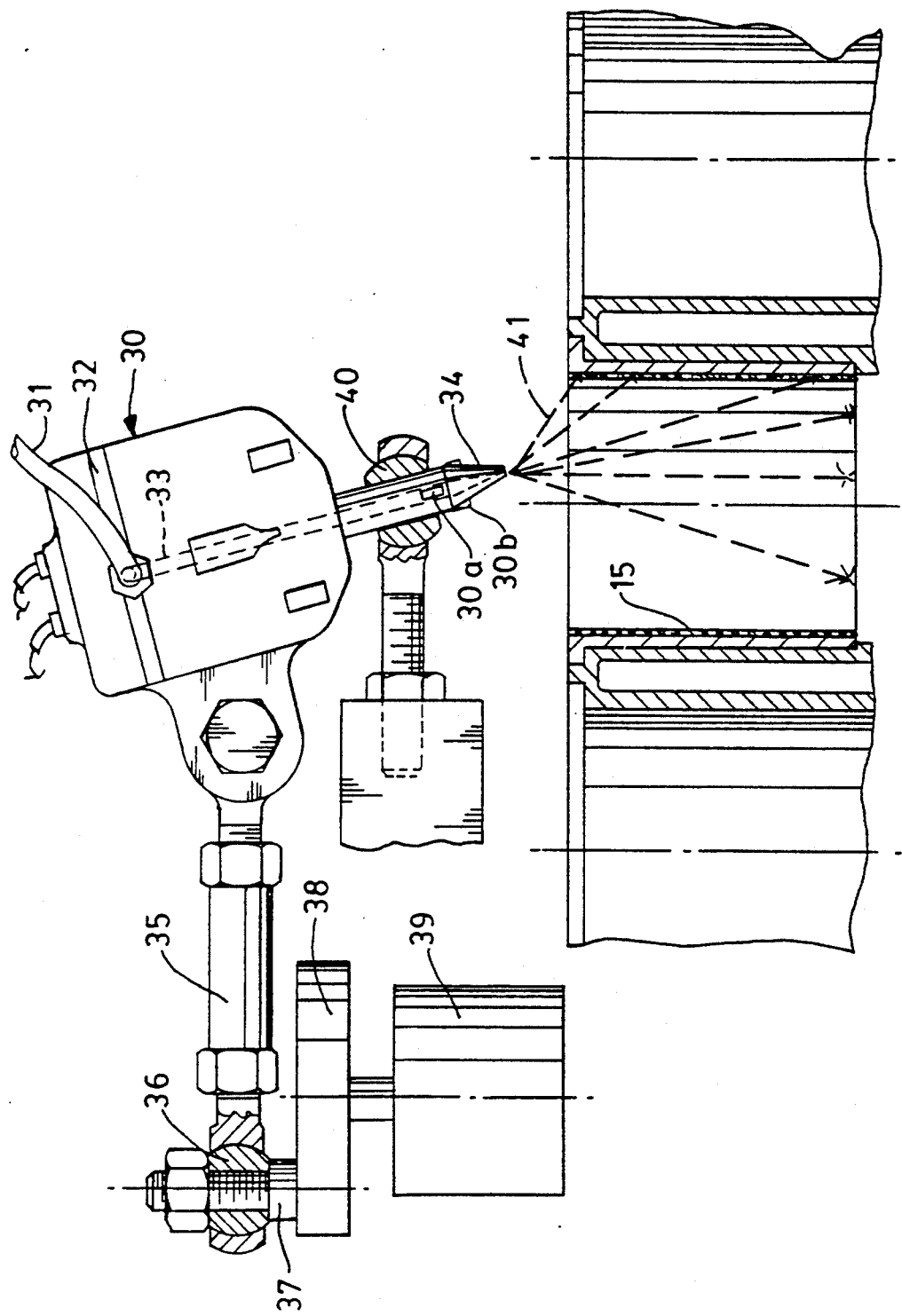
FIG. 15 is a view of the coating apparatus for depositing at high temperatures a plasma metallic-based coating on a cylinder bore shown in cross-section.

Plasma spraying may be carried out by equipment, as illustrated in FIG. 15, which uses a spray gun 30 having a pair of interior electrodes 30a and 30b that create an arc through which powdered metal and inert gas are introduced to form a plasma. The powder may be introduced through a supply line 31 connected to a slip ring 32 that in turn connects to a powder channel 33 that delivers to the nozzle 34. The plasma heats the powder, being carried therewith, along the shells of the powder only. The gun is carried on an articulating arm 35 which is moved in a combined circular linear movement by a journal 36 carried on an eccentric positioner 37 which in turn is carried on a rotating disc 38 moved by motor 39. The nozzle 34 of the gun is entrained in a fixed swivel journal 40 so that the spray pattern 41 is moved both annularly as well as linearly up and down the bore surface 15 as a result of the articulating motion of the gun.

Variations of the plasma spray coating can be obtained by mixing particles consisting of nickel or cobalt encapsulating solid lubricants along with hard particles such as ferro-chrome or ferro-manganese. The hard particles will produce a very hard matrix deposit due to the interaction alloying with nickel in the hot plasma flame to create intermetallics. This is a very desirable condition for decreased wear without any increase in friction. In such cases, only a very thin upper solid film lubricant coating is needed.

The thickness of the coating should be controlled to about 120-140 microns allowing for the subsequent removal of about 100 microns by honing. Honing should be carried out by conventional honing stones to not affect the chemistry of the coating.

Proper selection of the metallic content of the particles in the powder material will allow for an important feature of this invention, which is the air hardening of a portion of such metallic content to a very hard condition while the other metallic portion resides in situ in the coating itself. To this end, the coating is subjected to high temperature frictional use, such as engine usage itself, whereby combustion gases and the frictional scraping of the piston rings subjects the exposed portions of the coating to heat and pressure that causes hardening to take place within the exposed steel itself. It is the carbon in FeCr and in the solid film lubricant that makes such hardening possible. The hardness conversion can be explained as follows: the fused particle, as it cools through melting and solidifying, will form an air-hardenable steel composition such as Hadfield manganese steel.

Figure 16:
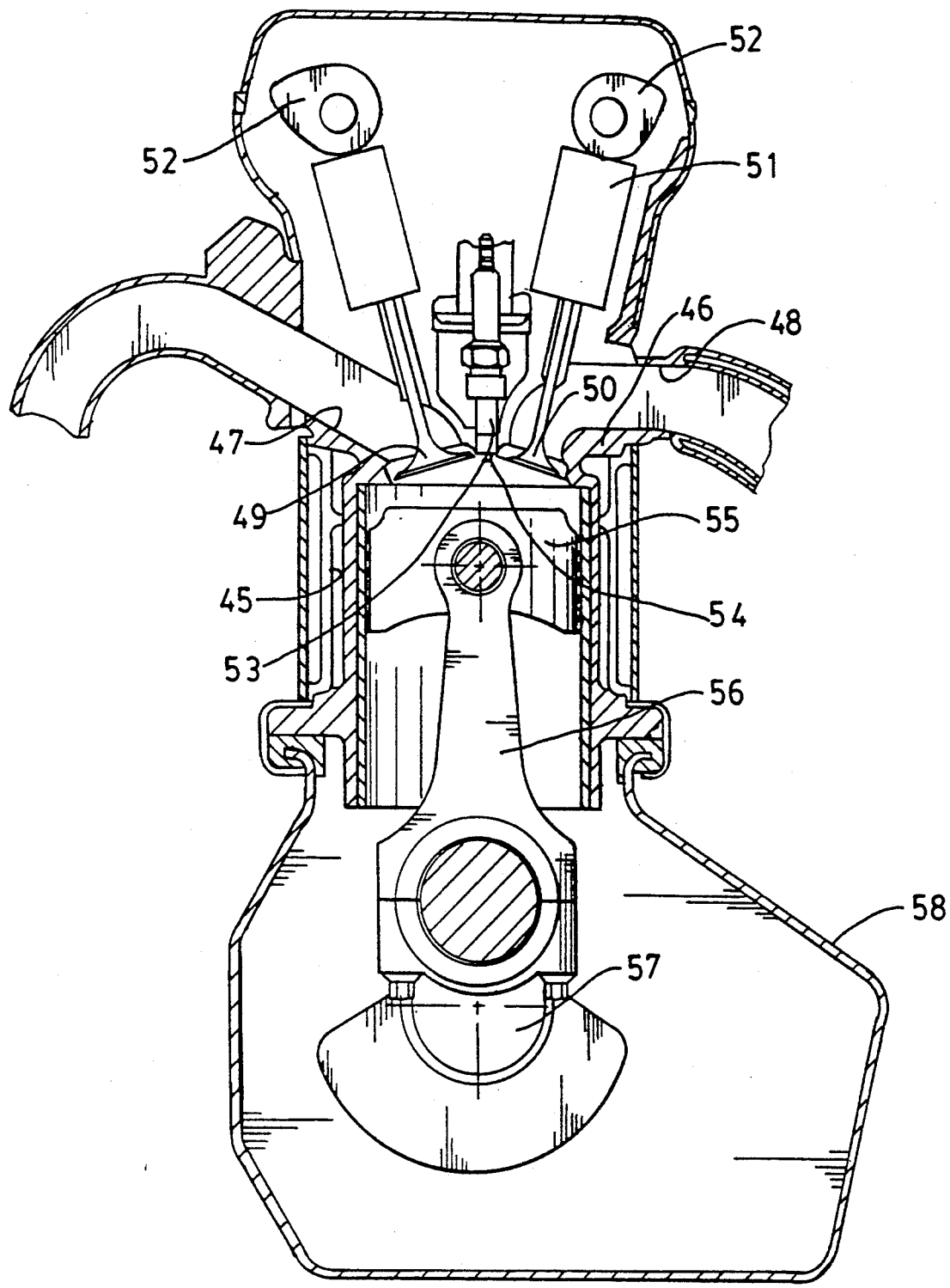
FIG. 16 is a cross-sectional illustration of an internal combustion engine containing the product of this invention showing one coated cylinder bore in its environment for reducing the total engine friction, vibration, and fuel consumption for such engine.

Yet another aspect of this invention is the completed product resulting from the practice of the method and use of the chemistry described herein. As shown in FIG. 16, the product is an engine block with at least one anti-friction coated cylinder bore. The product comprises: (a) a cast aluminum alloy based cylinder block having at least one cylinder bore wall; (b) a hard, load-supporting face on the wall; and (c) a mixture adherent on said face, which mixture comprises oil-attracting solid lubricant particles and fused, air-hardened steel particles, the mixture supporting loads of at least 10 psi at temperatures of 600°-800° F. while being stable at such temperatures, the mixture having at least two elements selected from the group consisting of graphite, molybdenum disulfide, boron nitride, calcium difluoride, sodium fluoride, tungsten disulfide, and lithium fluoride.

Such product is characterized by a reduction in engine friction resulting from reduction of piston system friction of at least 25% because of the ability to operate the engine with near zero piston/cylinder bore clearance as well as a reduction in mechanical boundary friction. Furthermore, such product provides for reduction in the hydrocarbon emissions from the engine by at least 25% because of the adaptation of the piston ring designs disclosed in concurrently filed patent applications and thereby reduce the top land crevice volume. The blow-by of the engine (combustion gases blowing past the piston rings) is reduced also by 25% because of the near zero clearance combined with the piston ring design just cited. Furthermore, the temperature of the coolant used to maintain proper temperature of the engine can be reduced by 20° F. because a significantly lower viscosity oil can be used with such change. The oil temperature can be reduced by at least 50° F., when coupled with the avoidance of tar deposit formation on the combustion chamber surfaces, and an increase in the compression ratio of the engine by at least one with the attendant improvement in fuel economy and power.

Another significant aspect of the coated block, in accordance with this invention, is the ability for resisting formic acid formation using flex fuels containing methanol. Typically, an engine would have its surfaces degrade at 20,000 miles or greater as a result of the formation of formic acid under a peculiar set of engine conditions with such flex fuels. With the use of the coated bore walls as herein, such resistance to formic acid corrosion is eliminated. Moreover, the coated product obtains greater accuracy of roundness within the cylinder bore as the conventional rings ride thereagainst, contributing to the reduction in blow-by as mentioned earlier.

The coated block plays an important role in the overall operation of engine efficiency. As shown in FIG. 16, the block has an interior cooling jacket 45 along its sides, and cooperates to receive a head 46 containing intake and exhaust passages 47, 48 opened and closed by intake and exhaust valves 49, 50 operated by a valve train 51 actuated by camshafts 52. The combustible gases are ignited by spark ignition 53 located centrally of the combustion chamber 54 to move the piston 55, which in turn actuates a connecting rod 56 to turn a crankshaft 57 rotating within a crank case 58. Oil is drawn from the crank case 58 and splashed within the interior of the block to lubricate and bathe the piston 55 during its reciprocal movement therein. The cooling fluid circulates about the cylinder bore wall to extract heat therefrom, which influences the efficiency of the engine by reducing the heat input into the air/fuel charge during the intake stroke, and thus increases volumetric efficiency as well as power and fuel economy.

We claim:
1. A thermally sprayable powder, comprising:
 (i) solid lubricant particles comprising at least two materials selected from the group consisting of graphite, $MoS_2$, BN, $CaF_2$, NaF, $WS_2$, and LiF;
 (ii) a major proportion of fusible particles distributed throughout said solid lubricant particles, said fusible particles being air-hardenable upon friction-promoting use of the powder to a hardness of at least 60 Rc; and
 (iii) a low melting medium binding said solid lubricant particles and fusible particles together in agglomerated grains.
2. The powder as in claim 1, in which said fusible particles are steel particles and said powder is plasma sprayable.

3. The powder as in claim 2, in which said steel particles are stainless steel comprised of 8-20% Cr, 2-8% Mn, and 8-16% Ni.

4. The powder as in claim 2, in which said particles are alloy steel comprised of 4-8% Mn, 4-20% Cr, 2-4% Ni, and 0.1-0.4% C.

5. The powder as in claim 1, in which said fusible particles are present in said grains in an amount of 74-84% by weight.

6. The powder as in claim 1, in which said solid lubricant particles are present in said grains in an amount of 4-25% by weight and said medium is present in an amount of 1-2% by weight.

7. The powder as in claim 1, in which said medium is wax or thermally removable thermoplastic polymer.

8. The powder as in claim 1, in which said solid lubricant particles are encapsulated in a thin, soft metal shell selected from the group consisting of nickel, cobalt, and copper.

9. The powder as in claim 1, in which said medium melts at a temperature above 200° F.

* * * * *